United States Patent [19]

Ishiwata

[11] Patent Number: 5,572,391
[45] Date of Patent: Nov. 5, 1996

[54] MAGNETIC HEAD

[75] Inventor: Nobuyuki Ishiwata, Tokyo, Japan

[73] Assignee: NEC Corporation, Tokyo, Japan

[21] Appl. No.: 155,185

[22] Filed: Nov. 22, 1993

Related U.S. Application Data

[63] Continuation of Ser. No. 873,169, Apr. 24, 1992, abandoned.

[30] Foreign Application Priority Data

Apr. 24, 1991 [JP] Japan ................................ 3-119083
Apr. 24, 1991 [JP] Japan ................................ 3-119084

[51] Int. Cl.$^6$ ....................................................... G11B 5/235
[52] U.S. Cl. .......................... 360/120; 360/126; 428/693; 428/701; 428/704; 428/900
[58] Field of Search .................................. 428/693, 694, 428/701, 704, 900; 360/126, 120

[56] References Cited

U.S. PATENT DOCUMENTS

| | | | |
|---|---|---|---|
| 4,608,293 | 8/1986 | Wada et al. | 428/141 |
| 4,659,606 | 4/1987 | Wada et al. | 428/141 |
| 4,695,512 | 9/1987 | Hatanai et al. | 428/408 |
| 4,808,463 | 2/1989 | Yoshikatsu et al. | 428/215 |
| 4,819,113 | 4/1989 | Kubota et al. | 360/126 |
| 5,026,614 | 6/1991 | Itoh et al. | 428/658 |
| 5,038,242 | 8/1991 | Fukushima et al. | 360/120 |
| 5,117,321 | 5/1992 | Nakanishi et al. | 360/120 |
| 5,182,690 | 1/1993 | Katori et al. | 360/120 |

FOREIGN PATENT DOCUMENTS 0444962  9/1991  European Pat. Off.
2257404 10/1990  Japan.

OTHER PUBLICATIONS

Patent Abstracts of Japan, vol. 14, No. 525 (P-1132) 19 Nov. 1990 (JP-A-2 219 092).
Patent Abstracts of Japan, vol. 15, No. 143 (E-1054) 11 Apr. 1991 (JP-A-3 019 483).
Patent Abstracts of Japan, vol. 15, No. 67 (P-1167) 18 Feb. 1991 (JP-A-2 291 597).
Proceedings of the SID. vol. 21, No. 4, 1980, Los Angeles, US, pp. 327–332; H. Murakami et al.: "An experimental TV Display using a Gas-Discharge Panel with Internal Memory." Patent Abstract of Japan, vol. 15, No. 15, 11 Jan. 1991 (02–257404).

*Primary Examiner*—Stevan A. Resan
*Attorney, Agent, or Firm*—Sughrue, Mion, Zinn, Macpeak & Seas

[57] ABSTRACT

A magnetic structure is provided with an alumina layer formed between a ceramic substrate and a soft magnetic layer. The alumina layer has a formative energy of oxide lower than that of the soft magnetic layer to protect diffusion of oxygen to the soft magnetic layer, when the soft magnetic layer is heated to be formed. Further, a bonding glass layer is positioned between the ceramic substrate and the alumina layer, and another ceramic substrate is formed on the soft magnetic layer.

2 Claims, 6 Drawing Sheets

MAGNETIC HEAD

This is a Continuation of application No. 07/873,169 filed Apr. 24, 1992, now abandoned.

FIELD OF THE INVENTION

This invention relates to a magnetic structure, and more particularly to, a magnetic structure used in a magnetic head.

BACKGROUND OF THE INVENTION

A first conventional magnetic head includes a ceramic substrate and a soft magnetic layer formed on the ceramic substrate. In such a magnetic head, the soft magnetic layer is made of FeSiAl or FeMN (M=Ti, Zr, Nb, Mo, Hf or Ta) having a large saturation magnetization. The ceramic substrate includes a great amount of oxide such as NiO, MnO, CoO, etc. each having a large thermal expansion factor close to that of the soft magnetic layer. In fabrication, FeSiAl or FeMN is grown on a surface of the ceramic substrate by gas phase crystal growth such as sputtering and is heated by more than 500° C., so that the soft magnetic layer is formed.

According to the first conventional magnetic head, however, there are disadvantages in that oxygen in the ceramic substrate is diffused to the soft magnetic layer when the thermal treatment is carried out, because a formative energy of oxide in the soft magnetic layer is lower than that of the ceramic substrate. As the result, magnetic property of the soft magnetic layer is reduced. This disadvantage is noteworthy when a ceramic substrate includes NiO and CoO. In addition, it is difficult that the surface of the ceramic substrate is flattened, because a ceramic is difficult to be ground. Therefore, the ceramic substrate and the soft magnetic layer are not fastened closely.

A second conventional magnetic head includes a ceramic substrate, a soft magnetic layer, and a bonding glass layer formed between the soft magnetic layer and the other ceramic substrate.

According to the second conventional magnetic head, however, there is a disadvantage in that a yield of the magnetic head is not high, because the bonding glass layer is difficult to provided a sufficient bonding strength on the soft magnetic layer.

SUMMARY OF THE INVENTION

Accordingly, it is an object of the invention to provide a magnetic structure keeping a high magnetic property.

It is another object of the invention to provide a magnetic structure which can be fabricated with high yield.

According to a first feature of the invention, a magnetic structure, including:

a first substrate;

a magnetic layer; and a protection layer formed between the first substrate and the magnetic layer, and having a formative energy of oxide lower than that of the magnetic layer.

According to a second feature of the invention, a magnetic structure, further including:

a bonding glass layer formed between the substrate and the protection layer; and a second substrate formed on another surface of the magnetic layer, so that the magnetic structure is shaped to be covered with the first and second substrates.

BRIEF DESCRIPTION OF THE DRAWINGS

The invention will be explained in more detail in conjunction with appended drawings; wherein.

DESCRIPTION OF THE PREFERRED EMBODIMENTS

Before describing a magnetic head according to the invention, the briefly aforementioned conventional magnetic heads will be explained in conjunction with FIGS. 1, 2A, 2B and 3.

Figure 1:
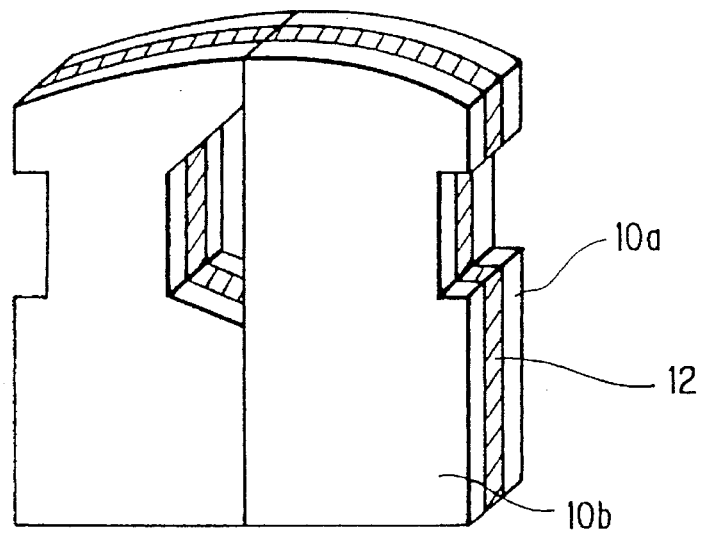
FIG. 1 is a perspective view showing a conventional magnetic head.

FIG. 1 shows an approximate structure of a conventional magnetic head which includes two ceramic substrates 10a and 10b and a magnetic core 12 formed between the two ceramic substrates 10a and 10b.

Figure 2A:
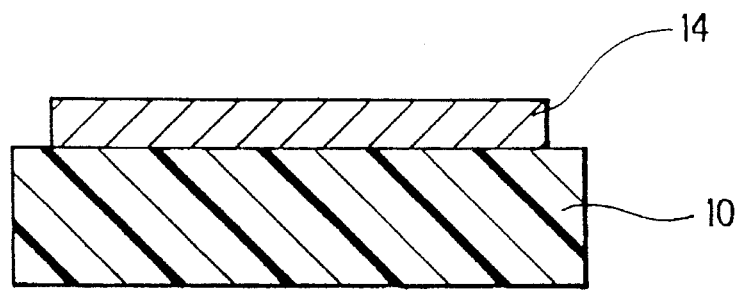
FIGS. 2A and 2B are cross sectional views showing a part of a first conventional magnetic head, respectively.
Figure 2B:

FIG. 2A shows a part of a first conventional magnetic head which includes a ceramic substrate 10 made of MnO and NiO shown in FIG. 2B and a soft magnetic layer 14 of FeTaN formed on the ceramic substrate 10. The soft magnetic layer 14 becomes a magnetic core of the magnetic head.

According to the first conventional magnetic head, however, there is a disadvantage in that oxygen in the ceramic substrate 10 is diffused to the soft magnetic layer 14 when the thermal treatment is carried out to form the soft magnetic layer 14, because formative energy of oxide in the soft magnetic layer 14 is lower than that of the ceramic substrate 10. As a result, magnetic property of the soft magnetic layer 14 is deteriorated.

Figure 3:
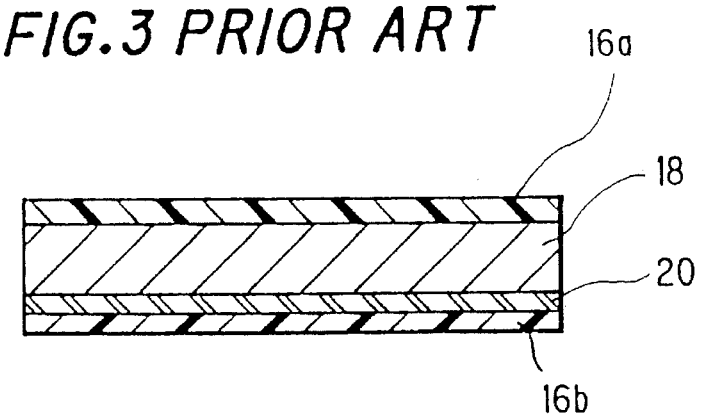
FIG. 3 is a cross sectional view showing a second conventional magnetic head.

FIG. 3 shows a second conventional magnetic head which is composed of two ceramic substrates 16a and 16b, a soft magnetic layer 18 formed on a surface of the ceramic substrate 16a, and a bonding glass layer 18 positioned between the sort magnetic layer 18 and the ceramic substrate 16b.

According to the second conventional magnetic head, however, there is a disadvantage in that the bonding glass layer 20 is difficult to provide a sufficient bonding strength on the soft magnetic layer 18 closely, so that a yield of the magnetic head is low. This is because a wet property of the bonding glass layer 20 on a metal is deteriorated as compared to that on a ceramic substrate or a glass substrate, so that a predetermined bonding strength is not obtained between the soft magnetic layer 18 and the bonding glass layer 20. For this reason, the separation between the soft magnetic layer 18 and the bonding glass layer 20 tends to occur during manufacture, so that a fabrication yield is lowered.

Figure 4A:
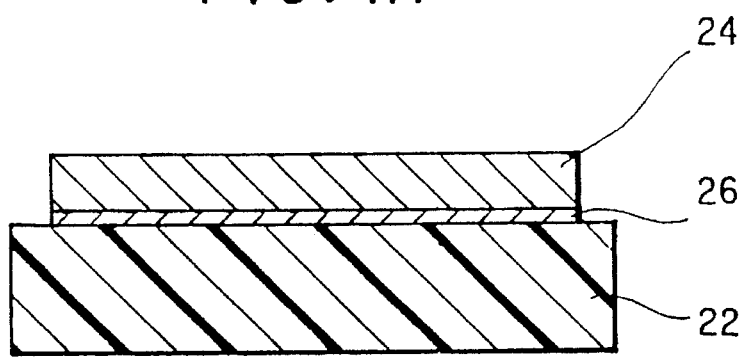
FIGS. 4A and 4B are cross sectional views showing a part of a magnetic head of a first preferred embodiment according to the invention, respectively.
Figure 4B:
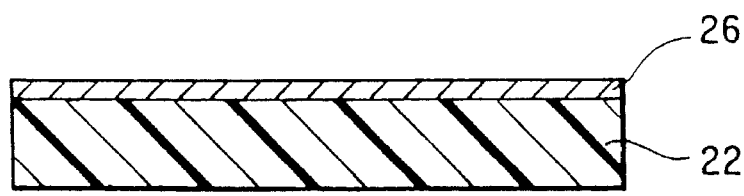

FIG. 4A shows a part of a magnetic head according to the first preferred embodiment of the invention which includes a ceramic substrate 22 made of MnO and NiO, a soft magnetic layer 24 made of FeTaN and an alumina layer 26 of $Al_2O_3$ formed between the ceramic substrate 22 and the soft magnetic layer 24. In fabrication, the alumina layer 26 having a thickness of 0.1 μm is formed on a surface of the ceramic substrate 22 as shown in FIG. 4B, and the soft magnetic layer 24 is formed on a surface of the alumina layer 26 by thermal treatment of 550° C. The alumina layer 26 may have a thickness of 0.05 μm.

Figure 5:
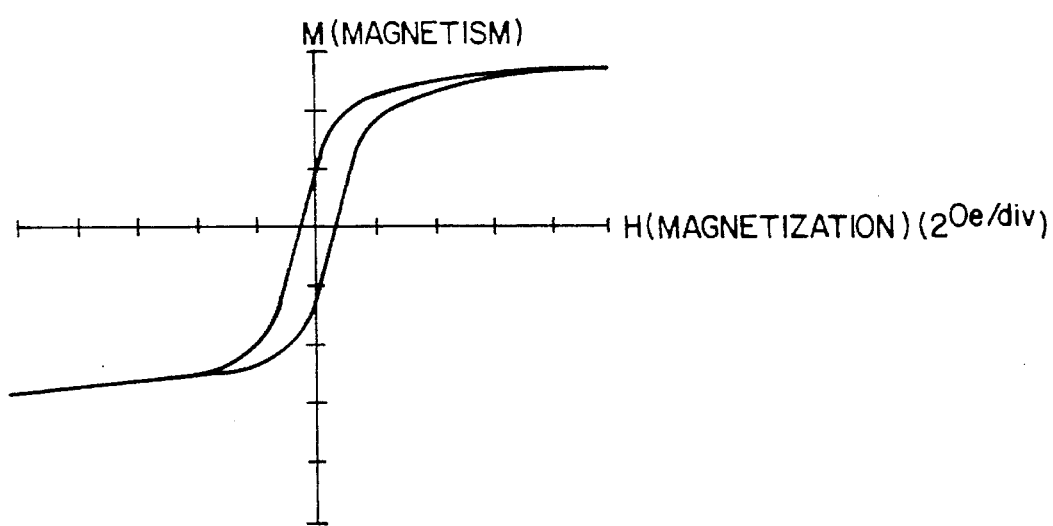
FIGS. 5 and 6 are graphs showing magnetization curves for explaining operation of the first preferred embodiment, respectively.
Figure 6:
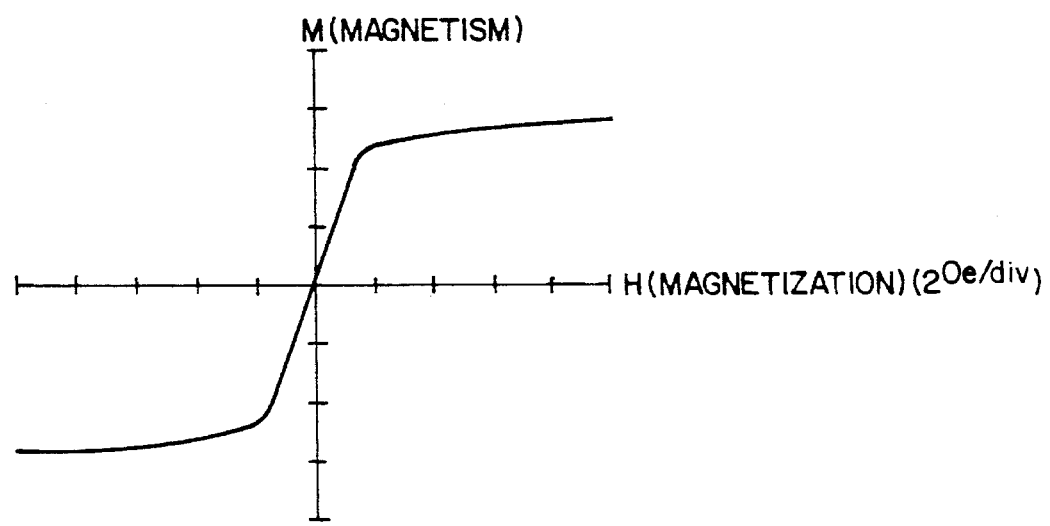

FIGS. 5 and 6 show magnetization curves of the first conventional magnetic structure shown in FIG. 2A and the first preferred embodiment shown in FIG. 4A, respectively. As shown the magnetization curves, according (the value of "M" at zero of "H") to the first preferred embodiment, the magnetism is reduced to substantially suppress the hysteresis property as compared to that of the first conventional magnetic structure. Thus, the magnetic property of the first preferred embodiment is improved to be higher than the first conventional magnetic structure.

Figure 7:
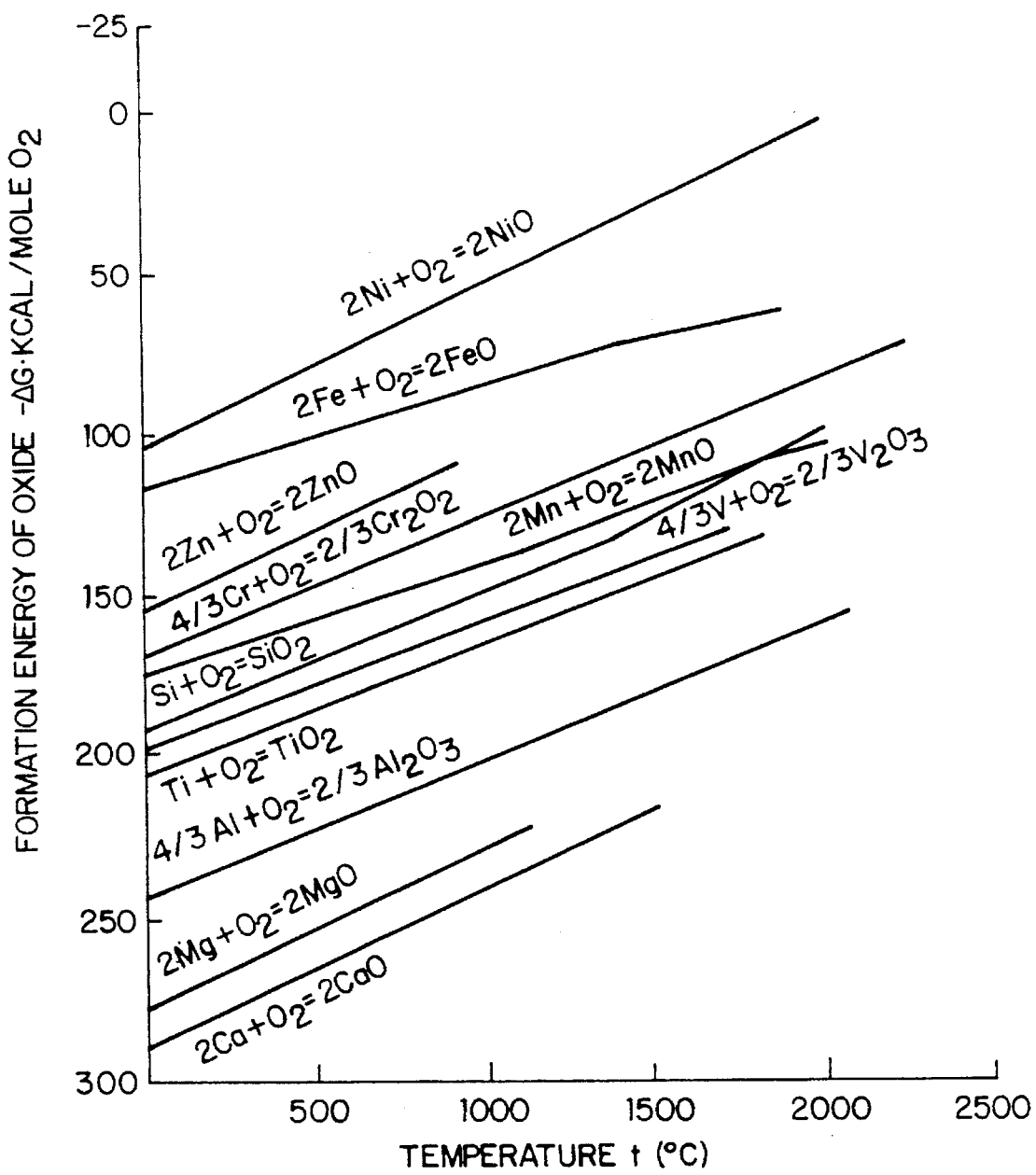
FIG. 7 is a graph showing formative energy of oxide for explaining operation of the first preferred embodiment.

FIG. 7 shows formative energy of oxide in relation to temperature. As shown in the figure, the formative energy of oxide of Ni included in the ceramic substrate 22 is higher than that of Fe included in the soft magnetic layer 24, so that, according to the firs conventional magnetic structure, oxygen of the ceramic substrate 22 is diffused to the soft magnetic layer 24 by the thermal treatment. When the phenomenon is shown by AES (Anger electron spectroscopy), it can be found that oxygen is diffused in a thickness direction of the magnetic head. According to the first preferred embodiment, oxygen does not diffuse to the soft magnetic layer 24, because the formative energy of oxide of Al included in the alumina layer 26 is lower than that of the soft magnetic layer 24.

In the first preferred embodiment, even if the ceramic substrate 22 is made of CaO, $TiO_2$ and NiO, the same effect can be obtained.

Figure 8:
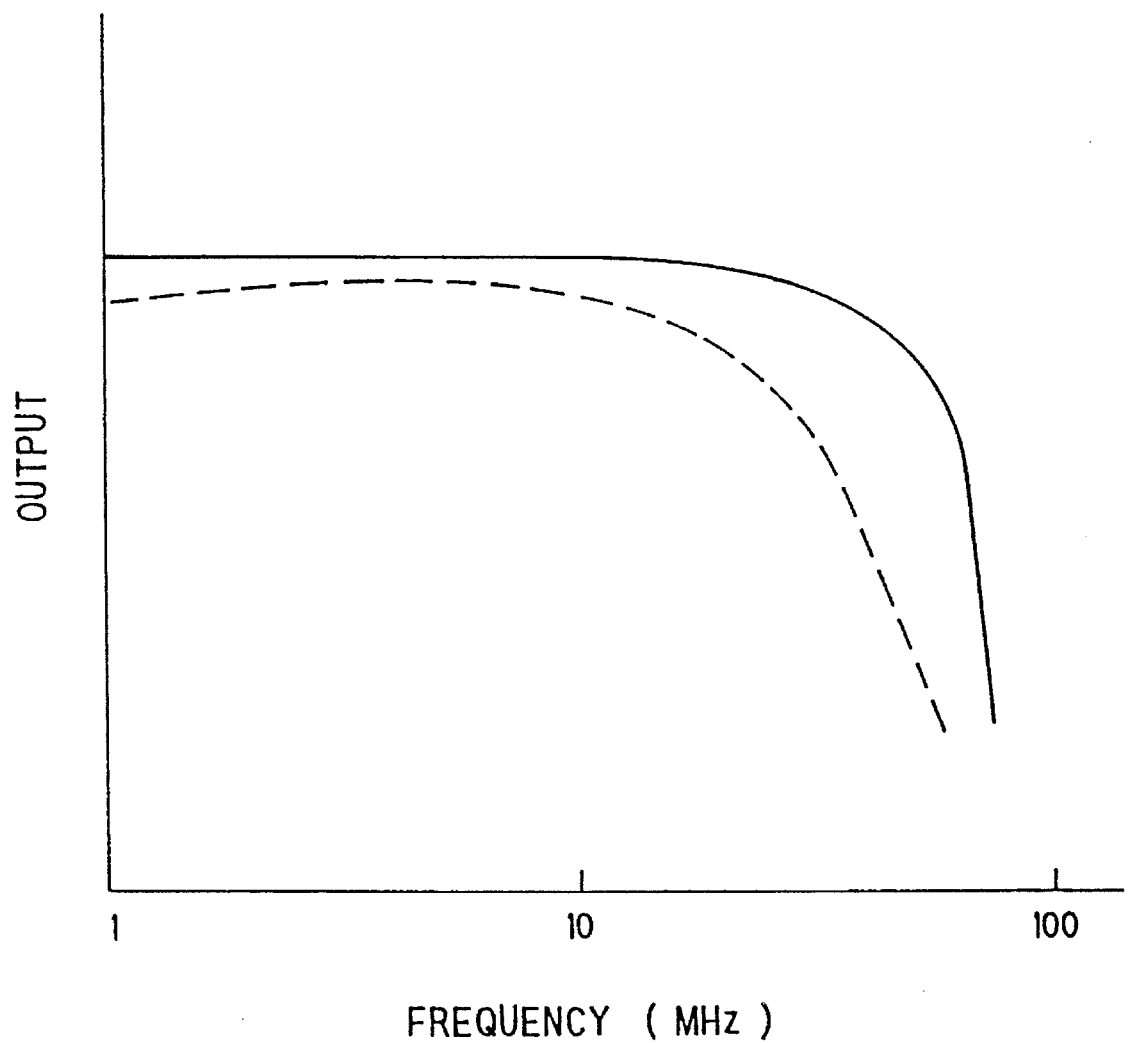
FIG. 8 is a graph showing output levels of a magnetic head relative to frequency for explaining operation of the first preferred embodiment.

FIG. 8 shows output level of a magnetic head. In this graph, an output of a magnetic head of the first preferred embodiment is shown by solid line, and an output of the first conventional magnetic head is shown by a dashed line. Each of the magnetic heads has a soft magnetic layer of FeTaN having a thickness of 5 μm, and is provided with a gap having a width of 0.3 μm. As shown by the graph, the first preferred embodiment provides an output higher than that of the conventional one. The effect is caused by the structure in that the soft magnetic layer 24 of the first preferred embodiment has a high magnetic property.

In the first preferred embodiment, the ceramic substrate may be made of composite material including CoO. A layer made of CaO, MgO, $TiO_2$, $V_2O_3$, $SiO_2$, MnO, $Cr_2O_3$, ZnO, etc. can be used instead of $Al_2O_3$ of the alumina layer 26, and nitride, carbide and composite material thereof can be used instead of oxide. The soft magnetic layer 24 may be made of FeMN (M=Ti, Zr, Nb, Mo, Hf or Ta) system layer or FeSiAl layer.

As described above, according to the first preferred embodiment, the magnetic structure has a high magnetic property, because the magnetic structure is provided with the alumina layer 26 having a formative energy of oxide lower than that of the soft magnetic layer 24. In addition, a surface faced to the soft magnetic layer 24 can be flattened with high precision by abrasion of the alumina layer 26. Therefore, the ceramic substrate 22 and the soft magnetic layer 24 are fastened closely.

Figure 9:
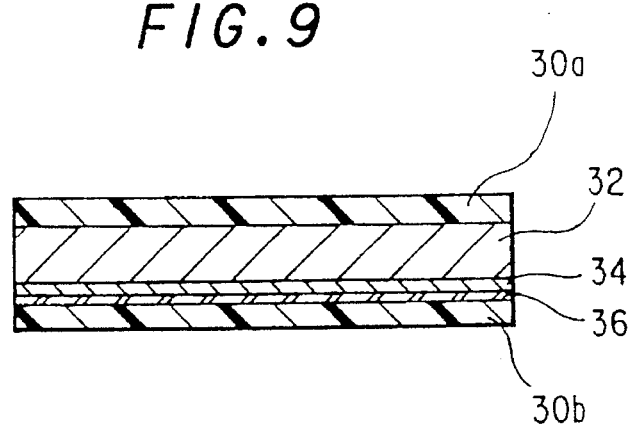
FIG. 9 is a cross sectional view showing a magnetic head of a second preferred embodiment according to the invention.

FIG. 9 shows a structure of a magnetic head of the second preferred embodiment according to the invention. The magnetic head includes two ceramic layers 30a and 30b made of MnO and NiO, a soft magnetic layer 32 of FeTaN formed on a surface of the ceramic substrate 30a, an alumina layer 34 of $Al_2O_3$ having a thickness of 0.1 μm formed on the other surface of the soft magnetic layer 32, and a bonding glass layer 36 formed between the soft magnetic layer 34 and the ceramic substrate 30b.

Figure 10A:
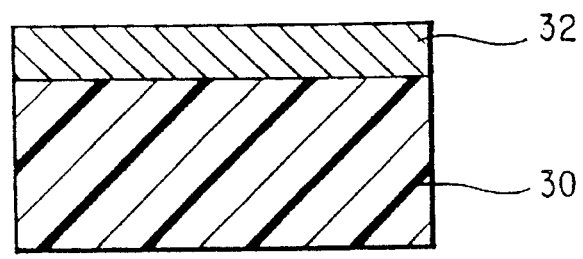
FIGS. 10A and 10B are cross sectional views showing samples for explaining operation of the second preferred embodiment, respectively.
Figure 10B:
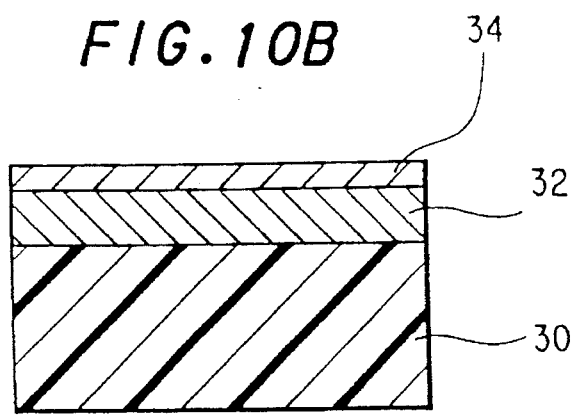

Next, experiment for the second preferred embodiment will be explained in conjunction with FIGS. 10A and 10B. In a first experiment, first and second samples are used. The first sample is composed of a ceramic substrate 30 of MnO and NiO and a soft magnetic layer 32 of FeTaN formed on the ceramic substrate 30 shown in FIG. 10A, and the second sample is composed of a ceramic substrate 30, a soft magnetic layer 32 formed on the ceramic substrate 30 and an alumina layer 34 of $Al_2O_3$ having a thickness of 0.1 μm formed on the soft magnetic layer 32 shown in FIG. 10B. Bonding glass layers are formed on a surface of the soft magnetic layer 32 of the first sample and a surface of the alumina layer 34 of the second sample, and each of the samples is heated by 550° C. under the pressure of 1 kg to the bonding glass layer. After that, shear strength of each ten of the samples are determined, and average of that is obtained as shown in the following table.

| SAMPLE No. | SHEAR STRENGTH |
| --- | --- |
| No. 1 (FIG. 10A) | 0.23 kg |
| No. 2 (FIG. 10B) | 0.54 kg |

As the result, it can be found that shear strength of a magnetic structure is increased by the provision of the alumina layer 34.

Next, yields of magnetic heads using the first and second samples are determined. As the result, a magnetic head using the first sample has a yield of 30%, while a magnetic head using the second sample has a yield of 70%. In this experiment, a gap of the magnetic head is determined to be 0.3 μm.

In a second experiment, third and fourth samples are used. The third sample is composed of a ceramic substrate 30 made of CaO, $TiO_2$ and NiO and a soft magnetic layer 32 of FeTaN formed on the ceramic substrate 30 shown in FIG. 10A, and the fourth sample is composed of a ceramic substrate 30, a soft magnetic layer 32 formed on the ceramic substrate 30 made of CaO, $TiO_2$ and NiO and an alumina layer 34 of $Al_2O_3$ having a thickness of 0.1 μm formed on the soft magnetic layer 32 shown in FIG. 10B. Bonding glass layers are formed on, a surface of the soft magnetic layer 32 of the third sample and a surface of the alumina layer 34 of the fourth sample, and each of the samples is heated by 680° C. under the pressure of 1 kg to the bonding layer. After that, shear strength of each ten of the samples are determined, and average of that is obtained as shown in the following table.

| SAMPLE No. | SHEAR STRENGTH |
| --- | --- |
| No. 3 (FIG. 10A) | 0.60 kg |
| No. 4 (FIG. 10B) | 1.13 kg |

As the result, it can be found that shear strength of a magnetic structure is increased by the provision of the alumina layer 34.

Next, yields of magnetic heads using the third and fourth samples are determined. As the result, a magnetic head using the third sample has a yield of 70%, while a magnetic head using the fourth sample has a yield of 95%. In this case, a gap of the magnetic head is determined to be 0.3 μm.

In the second preferred embodiment, a layer made of CaO, MgO, $TiO_2$, $V_2O_3$, $SiO_2$, MnO, $Cr_2O_3$, ZnO, etc. can be used instead of $Al_2O_3$ of the alumina layer 32, and nitride, carbide and composite material thereof can be used instead of oxide material. The soft magnetic layer 32 may be made of FeMN (M=Ti, Zr, Nb, Mo, Hf or Ta) system layer or FeSiAl layer including Ti, Cr and Ru.

As described above, according to the second preferred embodiment, the magnetic head has a high yield, because the bonding glass layer 36 can be bonded to the soft magnetic layer 32 tightly by the alumina layer 34 formed between them.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A magnetic head, comprising:

a first non-magnetic substrate;

a magnetic layer of metallic material; and means for inhibiting the diffusion of oxygen to said magnetic layer, said inhibiting means comprising a protection layer formed between said first substrate and said magnetic layer, and having a formative energy of oxide lower than that of said magnetic layer;

a bonding glass layer formed between said first substrate and said protection layer; and a second substrate formed on another surface of said magnetic layer, wherein said first and second substrates include NiO and CoO, and said magnetic layer is made of FeMN, where "M" is an element including at least one of Ti, Zr, Nb, Mo, Hf, and Ta, and N is nitrogen.

2. A magnetic head, according to claim 1, wherein:

said protection layer is a film made of at least one of $Al_2O_3$, CaO, and MgO.

* * * * *